Jan. 26, 1971  A. D. CAWTHORNE  3,559,061
METER AND SET POINT IMPEDANCE IN A SINGLE HOUSING
Filed March 18, 1968  2 Sheets-Sheet 1

INVENTOR.
Arthur David Cawthorne
BY
Mueller, Aichele, & Rauner
attys

INVENTOR.
Arthur David Cawthorne
BY
Mueller, Aichele, & Rauner
attys

United States Patent Office 3,559,061
Patented Jan. 26, 1971

3,559,061
METER AND SET POINT IMPEDANCE IN A SINGLE HOUSING
Arthur David Cawthorne, Scottsdale, Ariz., assignor to Motorola, Inc., Franklin Park, Ill., a corporation of Illinois
Filed Mar. 18, 1968, Ser. No. 713,928
Int. Cl. G01r 1/10
U.S. Cl. 324—157            6 Claims

ABSTRACT OF THE DISCLOSURE

A meter movement supplies a visual indication on a meter face. A set point unit including a slide wire is adjustable from in front of the meter face and has an indicator in front of the meter face for indicating the set point setting. The slide wire has an impedance distribution colinear with the graduations on the meter face. The meter housing is in two portions, one portion supporting the meter movement and the other the set point assembly.

BACKGROUND OF THE INVENTION

This invention relates to indicating meters and those constructions of indicating meters permitting a set point operation in the same compact housing.

In the proces control area it is quite common practice to have a set point unit to control a process. The condition of the process is indicated by a separate meter. Usually the set point indicator and the process indicating meter were located in close proximity on an operator's control console. Alternately, an indicating meter would have two pointers with one of them controlled electrically from a set point unit with no direct mechanical connection therebetween. This arrangement would be subject to errors caused by drift in the electrical connecting circuitry. Also, costs are increased because of the increased number of parts, power consumption and the like. This cost factor is especially important when a large number of meters and set point units are used to control a complex process. Also, in many instances the set point adjustment is different than the graduations on the process indicating meter face. With two separate indications, i.e.. set point and the process variable meter, operator response is subject to error in going from one meter to another.

SUMMARY OF THE INVENTION

It is an object of the present invention to provide an improved compact, low-cost combined process indicating meter and set point unit.

It is another object of the present invention to provide in conjunction with the preceding object a unit having a molded housing.

It is a further object of the invention in conjunction with the first mentioned object to provide a set point unit and a meter in the same housing wherein the two units are colinear, one with the other.

A feature of the invention is the provision of a slide-wire type of impedance unit located in parallel relation to a meter face and having an impedance distribution in accordance with the graduations on the meter face. An indicator arm is provided in front of the meter face indicating the adjustment of the impedance unit. A meter movement disposed coaxially with a slider assembly on the impedance unit such that a meter indicator point in front of the meter face moves colinearly with the adjustment of the impedance unit.

Another feature of the invention is the provision of a facile set point adjustment means comprising a thumb wheel on one portion of the housing which drives a driven wheel attached to a slider assembly. Over adjustment of the thumb wheel does not affect the calibration of the meter nor of the set point unit. The coaxial rotation of the slider assembly with the rotation of the meter movement indicator needle provides colinear adjustment.

Another feature of the invention is the provision of a meter on one portion of a housing disposed opposite to a set point unit supported solely on another portion of the housing.

THE DRAWING

DETAILED DESCRIPTION OF THE ILLUSTRATIVE EMBODIMENT

Figure 1:
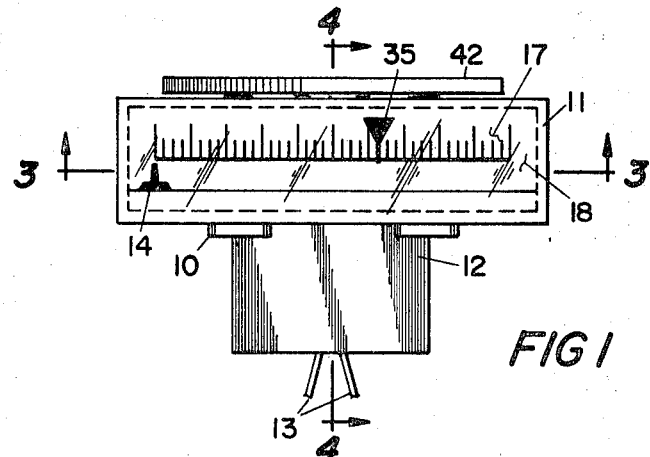
FIG. 1 is a diagrammatic front elevational view of a meter and set point unit incorporating the teachings of the present invention.
Figure 4:
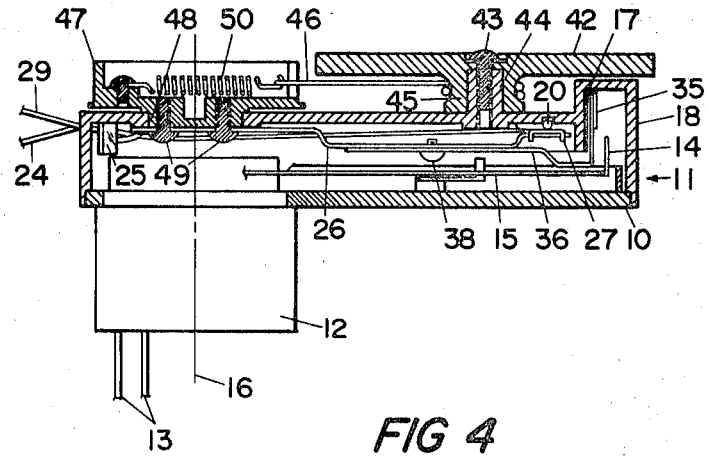
FIG. 4 is a diagrammatic sectional view taken in the directions of the arrows along line 4—4 in FIG. 1 and illustrating the relationship of the set point unit and the meter unit.
Figure 5:
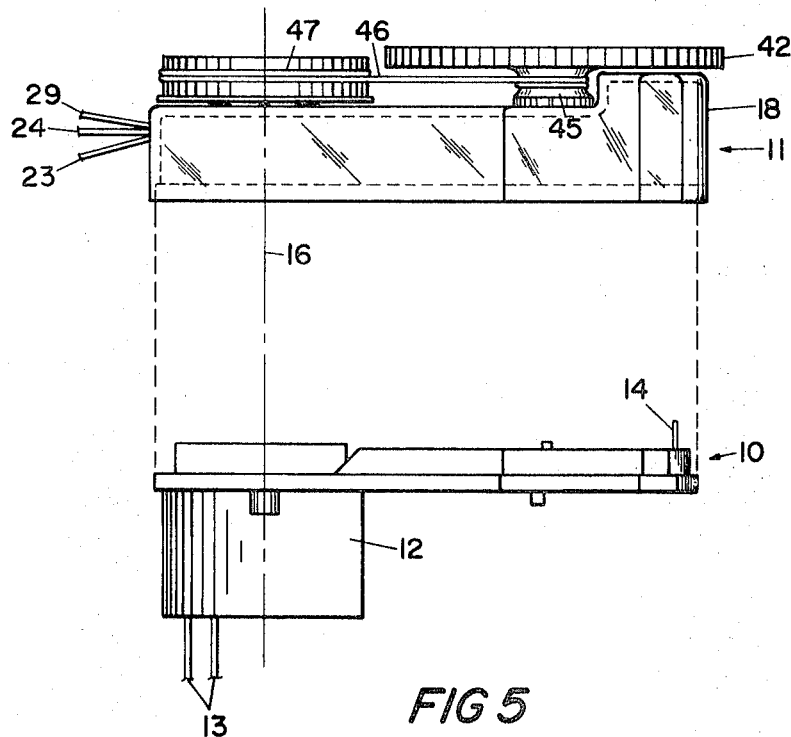
FIG. 5 is a diagrammatic side elevational view of the FIG. 1 assembly when the two housing portions have been separated and showing the relationship for assembly of the two portions.

Referring now to all figures in the drawing, like numbers indicate like parts and structural features in the various diagrammatic views. A first or lower housing portion 10, formed of molded plastic material, snugly fits into the lower edges of second or upper housing portion 11, as best seen in FIG. 4, to form a tight enclosure housing a meter and set point unit. Housing portion 10 was constructed of transparent plastic material molded in a single operation while portion 11 is block of opaque plastic material. An indicating meter movement 12 of known design is suitably mounted in the lower part of housing portion 10. A pair of electrical leads 13 provide electrical connections to meter movement 12. Indicator point 14 is mounted on indicator point support wire 15 (FIG. 4) which in turn is rotatably mounted in meter movement 12 and is rotatable about axis 16. As the meter movement 12 is actuated indicator point 14 is moved across the meter face 17 located at the first end portion of the housing portion 11. Meter face 17 has graduation marks as best seen in FIG. 1. These graduations may be linear, logarithmic, or in accordance with some other function, the selection of which is completely arbitrary. Transparent front wall 18 of housing portion 11 permits the meter face 17 to be viewed outside the housing.

Figure 3:
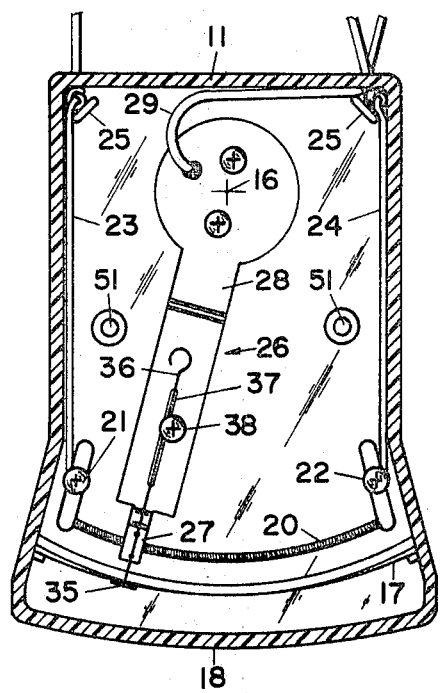
FIG. 3 is a diagrammatic sectional view taken in the directions of the arrows along line 3—3 in FIG. 1 and illustrating in bottom plan view the set point assembly utilized in the FIG. 1 illustrated assembly.

Referring more particularly to FIGS. 3 and 4, the set point unit of FIG. 1 assembly will be described in detail. A resistance slide wire 20 is disposed behind and parallel to meter face 17. Slide wire 20 and meter face 17 form arcs of concentric circles having the axis of rotation 16 on the common center. Slide wire 20 has a resistive impedance which is distributed along the wire colinearly with the graduations on meter face 17. While in the illustrated embodiment, there is a linear distribution of impedance, it is understood that nonlinear impedance distributions may be provided in slide wire 20. Also in accordance with nonlinear graduations on meter face 17 variable inductance may be substituted for slide wire 20 or a capacitive element (such as one having interleaved plates) may be utilized.

The resistance slide wire 20 is supported at its extreme ends by supports 21 and 22 which also serve to make electrical connections to the ends of the wire. Connecting wires 23 and 24 are threaded along the side walls of housing portion 11, and held in place by knots made therein and disposed between depending wire holding members 25 and the side walls of housing portion 11. The wires then extend through apertures formed in the housing portion 11 to outside the housing. To convert the slide unit 20 into a potentiometer type of set point unit, center top slider assembly 26 is rotatably mounted about axis of rotation 16, as will be fully described. Slider assembly 26 includes sliding contact 27, engaging resistance wire 20 and an electrical circuit from sliding contact 27 is formed through conductive support arm 28 and thence through wire 29 to outside the housing. Therefore, it is seen that wire 29 represents a center tap connection to potentiometer formed by slider assembly 26 and slide wire 20 while wires 23 and 24 form the extreme end connections.

A set point adjustment indicator 35 is mounted securely on slider assembly 26 to indicate the adjustment of the potentiometer. Set point indicator 35 is mounted on support wire 36 which in turn is radially slidably mounted on slider assembly 26. Radially slidable wire 36 permits adjustment of the radius of rotation for indicator 35; such adjustment permits the indicator 35 to move freely with respect to meter face 17 and meter pointer 4 (FIG. 3). Phillips head screw 38 securely holds wire 36 in depending groove 37 of metal member 28. For adjusting pointer 35, screw 38 is loosened and the wire moved radially inward or outward and then the screw is retightened.

Figure 2:
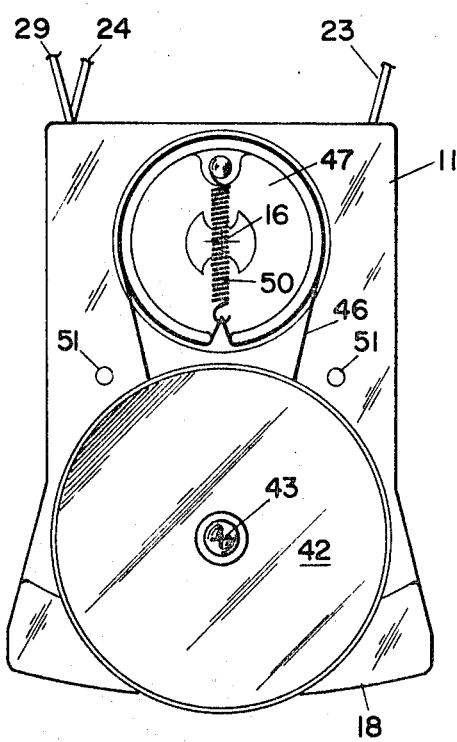
FIG. 2 is a diagrammatic top plan view of the FIG. 1 illustrated meter.

The rotation of slider assembly 26 is caused from the front of the meter assembly by thumb wheel 42 being rotated. Thumb wheel 42 is rotatably secured to upper housing portion 11 by screw 43, which may have its head in a recess, as shown, to provide minimum thickness of the meter assembly secured into upstanding boss 44. Thumb wheel 42 has a depending shank 45 rotatably disposed around boss 44. Shank 45 also serves as a means for supporting and moving driving cord 46. Driving cord 46, serving as a function drive means, translates motion from thumb wheel 42 to driven wheel 47. Driven wheel 47 is rigidly attached to slider assembly 26 for rotation therewith. Driven wheel 47 rotates about the axis of rotation 16 and is rotatably disposed in aperture 48 of upper housing portion 11. A pair of screws 49 (FIG. 4) fixedly secure slider assembly 26 to driven wheel 47. Cord 46 is wrapped several times around driver wheel 47 and is held secure by tensioning spring 50, best seen in FIGS. 2 and 4. It should be noted in FIG. 4 that assembly 26 rotatably slides on the lower inner surface of housing portion 11 while driven wheel 47 has a radially extending shoulder adjacent aperture 48 which slides on the outer surface of portion 11.

All parts except the screws and the conductive members are preferably formed of molded plastic materials. A pair of mounting holes 51 are formed in the housing portions for facilitating mounting the meter and set point assembly. With meter movement 12 and set point unit, including wire 20 and slider assembly 26, being mounted in separate housing portions, repair is facilitated in that a defective part can be removed and a replacement made. Also when using plastic materials a tight seal may be made between the upper and lower housing portions 10 and 11 such that dust or other contaminates do not enter the housing.

What is claimed is:
1. A combined meter and set point device which comprises:
(a) a housing for containing a meter movement, said housing having a transparent front wall at a first end thereof, and side walls connected to said transparent wall;
(b) a meter face having graduations thereon, said meter face being fixedly positioned within said housing and spaced from and extending along said transparent wall;
(c) a meter movement contained within said housing and spaced from said meter face, said movement including a first movable indicator arm having an axis of rotation, said first indicator arm extending from said axis toward said transparent wall and having a portion thereof extending between the meter face and the transparent wall;
(d) first means for electrically connecting said movement to the apparatus being monitored,
(e) elongated impedance means fixedly contained within said housing adjacent the meter face, said impedance means extending along said meter face and having an impedance distribution in accordance with the graduations on the meter face;
(f) support means located at each end of said impedance means for providing an external electrical connection for said impedance means,
(g) a slider rotatably mounted within said housing and having an axis of rotation spaced from the transparent wall, said slider including a second indicator arm having an axis of rotation, said second indicator arm extending from said axis toward said transparent wall and having a portion thereof extending between the meter face and the transparent wall, said slider also including an electrical contact movably engaging in electrical contact the elongated impedance means;
(h) second means connected to the contact of said slider and extending out of said housing for electrical connection to the external apparatus being controlled,
(i) a drive wheel rotatably mounted on said housing; and
(j) drive means operatively connecting said drive wheel to said slider for rotating said slider in response to movement of said drive wheel and thereby changing the location of the electrical contact on the elongated impedance in accordance with a desired change in set point.

2. The device of claim 1 wherein the axes of rotation of said first and second indicator arms are colinear.

3. The device of claim 2 wherein the impedance means and the meter face have an arcuate shape with each being an arc of concentric circles.

4. The device of claim 3 wherein the housing contains an aperture which is coaxial with the axes of rotation of said first and second arms; and
said drive means includes a driven wheel rotatably mounted on said housing and having a radius less than any distance from said axes of rotation to the sides or ends of said housing, said device further comprising:
means extending through said aperture for coupling the driven wheel to the slider; and
friction drive means operatively connecting the driven wheel and the drive wheel, said drive wheel being mounted on said housing to extend beyond the transparent wall to permit ready adjustment of the set point of the device.

5. The device of claim 4 wherein said drive wheel has a depending radially-reduced portion rotatably mounted on the exterior of said housing, said drive wheel having an axis of rotation that is parallel to the axes of rotation of said indicator arms, said driven wheel having a radius substantially greater than the radius of the depending portion of the drive wheel; and said friction drive means comprising a spring-tensioned flexible cord frictionally engaging the depending portion of said drive wheel and the driven wheel.

6. The combination of claim 5 wherein said aperture is circular and said driven wheel has a depending circular shank slidably fitting into said aperture and a radially outwardly extending circumferential shoulder slideably engaging the periphery of said aperture.

References Cited

UNITED STATES PATENTS

| | | | |
|---|---|---|---|
| 1,593,626 | 7/1926 | Foote | 324—98 |
| 3,274,491 | 9/1966 | Mulligan et al. | 324—157 |
| 3,281,684 | 10/1966 | Reeds, Jr. | 324—98 |
| 1,791,563 | 2/1931 | Horn | 73—359X |
| 3,194,080 | 7/1965 | Olson | 334—84 |

ALFRED E. SMITH, Primary Examiner